(12) United States Patent
    Maruyama et al.

(10) Patent No.: US 11,913,889 B2
(45) Date of Patent: Feb. 27, 2024

(54) PREDICTION DEVICE FOR PREDICTING A GROWTH DIRECTION OF A CRACK IN A SUBJECT AND PREDICTION METHOD

(71) Applicant: Panasonic Intellectual Property Management Co., Ltd., Osaka (JP)

(72) Inventors: Yuki Maruyama, Osaka (JP); Hiroya Kusaka, Hyogo (JP); Taro Imagawa, Osaka (JP); Akihiro Noda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 565 days.

(21) Appl. No.: 17/136,681

(22) Filed: Dec. 29, 2020

(65) Prior Publication Data

US 2021/0116388 A1    Apr. 22, 2021

Related U.S. Application Data

(63) Continuation of application No. PCT/JP2019/039825, filed on Oct. 9, 2019.

(30) Foreign Application Priority Data

Oct. 12, 2018 (JP) ................................ 2018-193786

(51) Int. Cl.
    *G01N 21/88* (2006.01)
    *G01B 11/16* (2006.01)
    (Continued)

(52) U.S. Cl.
    CPC ......... *G01N 21/8851* (2013.01); *G01B 11/16* (2013.01); *G06T 7/001* (2013.01);
    (Continued)

(58) Field of Classification Search
    CPC ................... G06T 7/001; G06T 7/0004; G06T 2207/10016; G06T 2207/20021;
    (Continued)

(56) References Cited

U.S. PATENT DOCUMENTS 4,175,447 A * 11/1979 Fukuhara ............... G01N 3/068
                                                              73/808
9,528,945 B2 * 12/2016 Handler ............... G01N 21/255
(Continued)

FOREIGN PATENT DOCUMENTS

JP        2016-176806        10/2016

OTHER PUBLICATIONS

International Search Report (ISR) dated Dec. 3, 2019 in International (PCT) Application No. PCT/JP2019/039825.
(Continued)

*Primary Examiner* — Michael P LaPage
(74) *Attorney, Agent, or Firm* — Wenderoth, Lind & Ponack, L.L.P.

(57) ABSTRACT

A prediction device for predicting the growth direction of a crack that occurs in a subject includes: an obtainer that obtains video of the subject; a derivation unit that derives displacement of each of a plurality of regions in the obtained video; a selector that selects, from among the plurality of regions, two or more regions each having displacement similar to displacement of a reference region included in the plurality of regions; and an identification unit that identifies, as the growth direction, the longitudinal direction of a collective region made up of the two or more selected regions.

6 Claims, 11 Drawing Sheets

(51) Int. Cl.
*G06T 7/00* (2017.01)
*G01M 5/00* (2006.01)

(52) U.S. Cl.
CPC ......... *G06T 7/0004* (2013.01); *G01M 5/0033* (2013.01); *G01N 2021/8861* (2013.01); *G01N 2021/8867* (2013.01); *G01N 2203/0066* (2013.01)

(58) Field of Classification Search
CPC ........... G06T 2207/30108; G06T 7/223; G06T 7/248; G01N 2203/0066; G01N 21/8851; G01N 2021/8861; G01N 2021/8867; G01B 11/16; G01M 5/005; G01M 5/0091; G01M 5/0033
See application file for complete search history.

(56) References Cited

U.S. PATENT DOCUMENTS

| | | | |
|---|---|---|---|
| 11,650,112 B1* | 5/2023 | Qing | G01L 1/248 |
| | | | 73/800 |
| 2015/0262346 A1* | 9/2015 | Horita | G06T 7/593 |
| | | | 348/137 |
| 2018/0308230 A1* | 10/2018 | Karube | G06N 3/08 |
| 2019/0385275 A1* | 12/2019 | Kikuchi | G06T 7/0004 |
| 2020/0175352 A1* | 6/2020 | Cha | G06N 3/04 |
| 2020/0284686 A1* | 9/2020 | Li | G01M 5/0091 |

OTHER PUBLICATIONS

Extended European Search Report dated Nov. 9, 2021 in corresponding European Patent Application No. 19871893.4.
Zhigang Wei et al., "Modeling of mixed-mode crack growth in ductile thin sheets under combined in-plane and out-of-plane loading", Engineering Fracture Mechanics, vol. 78, Sep. 2011, pp. 3082-3101.

* cited by examiner

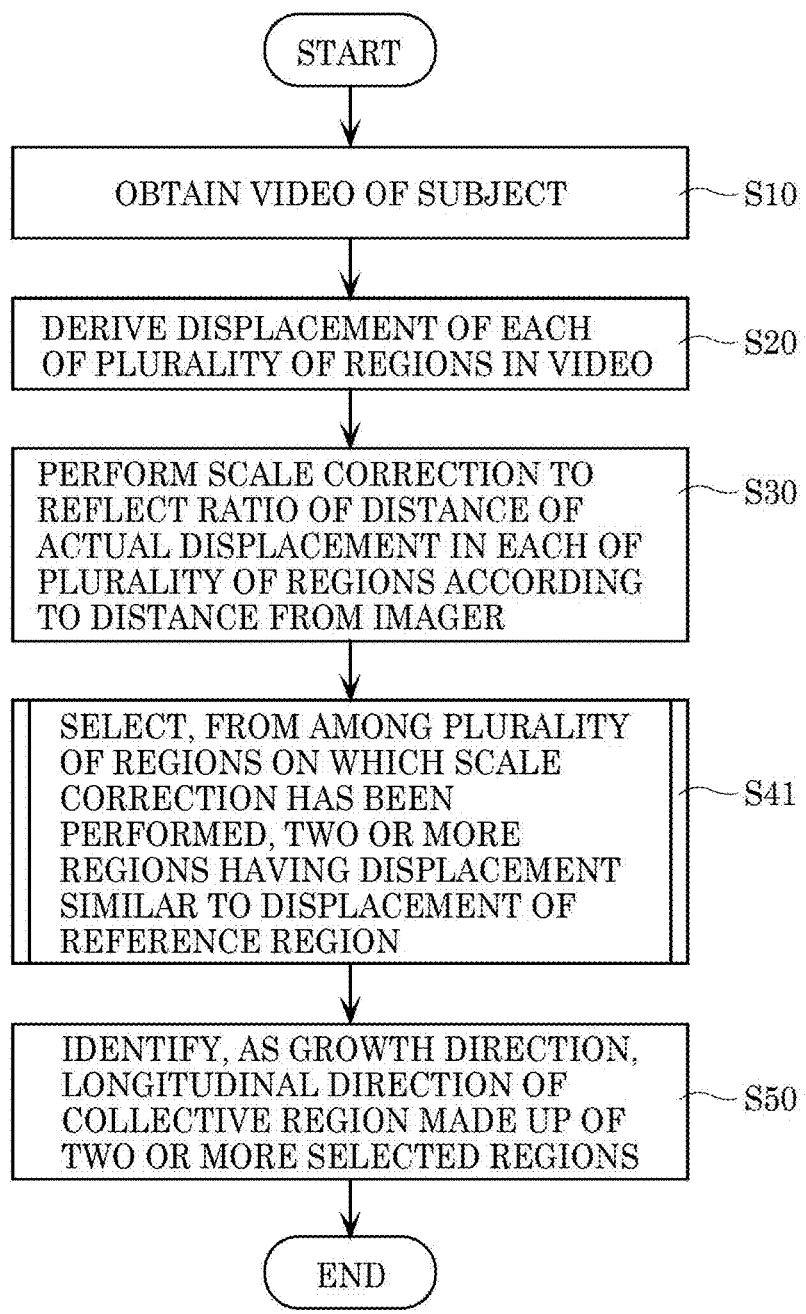

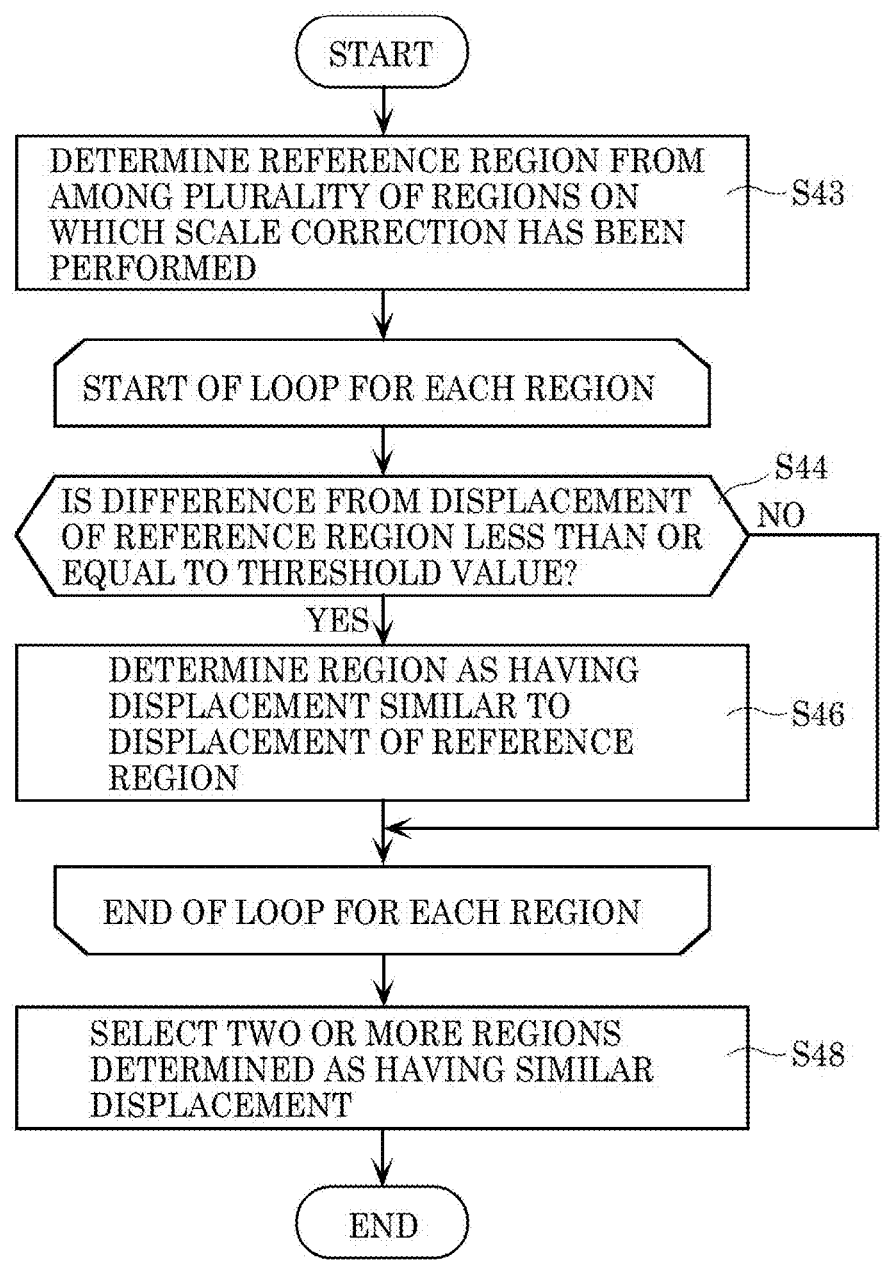

PREDICTION DEVICE FOR PREDICTING A GROWTH DIRECTION OF A CRACK IN A SUBJECT AND PREDICTION METHOD

CROSS REFERENCE TO RELATED APPLICATIONS

This is a continuation application of PCT International Application No. PCT/JP2019/039825 filed on Oct. 9, 2019, designating the United States of America, which is based on and claims priority of Japanese Patent Application No. 2018-193786 filed on Oct. 12, 2018. The entire disclosures of the above-identified applications, including the specifications, drawings and claims are incorporated herein by reference in their entirety.

FIELD

The present disclosure relates to prediction devices and prediction methods for predicting the growth direction of a crack that occurs in a subject.

BACKGROUND

As a conventional technique for inspecting the exterior of a subject, for example, Patent Literature (PTL) 1 discloses a technique for remotely calculating displacement without contact using time-series images of a structure through image correlation calculation.

Furthermore, it is known that the growth direction of a crack can be predicted by calculating strain and stress in a structure by differentiating displacement calculated for more than one measurement point, and then determining the direction of principal stress from the stress.

CITATION LIST

Patent Literature

PTL 1: Japanese Unexamined Patent Application Publication No. 2016-176806

SUMMARY

Technical Problem

However, in the technique disclosed in PTL 1, since the displacement is calculated using the time-series images of a structure through the image correlation calculation, susceptibility to errors due to camera noise, etc., is high. Therefore, with a combination method according to the related art in which the displacement calculated through the image correlation calculation is differentiated and principal stress is calculated using the calculated stress, it is problematic that the growth direction of a crack cannot be accurately determined.

Thus, the present disclosure provides a prediction device and a prediction method by which the growth direction of a crack that occurs in a subject can be accurately determined.

Solution to Problem

A prediction device according to one aspect of the present disclosure is used to predict a growth direction of a crack that occurs in a subject and includes: an obtainer that obtains video of the subject; a derivation unit configured to derive displacement of each of a plurality of regions in the video obtained; a selector that selects, from among the plurality of regions, two or more regions each having displacement similar to displacement of a reference region included in the plurality of regions; and an identification unit configured to identify, as the growth direction, a longitudinal direction of a collective region made up of the two or more regions selected.

Note that the above general or specific aspect may be implemented using a system, a method, an integrated circuit, a computer program, or a computer-readable recording medium such as a recording disc, or any combination of systems, methods, integrated circuits, computer programs, and recording media. The computer-readable recording medium includes, for example, a nonvolatile recording medium such as a compact disc read-only memory (CD-ROM). Additional benefits and advantages of one aspect of the present disclosure will become apparent from the Specification and the Drawings. The benefits and/or advantages may be individually provided by the various aspects and features disclosed in the Specification and the Drawings, and need not all be provided in order to obtain one or more of such benefits and/or advantages.

Advantageous Effects

The growth direction of a crack that occurs in a subject can be accurately predicted by the prediction device and the prediction method according to the present disclosure.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a flowchart illustrating one example of an operation of a prediction device according to Embodiment 2.

FIG. 11 is a flowchart illustrating a detailed flow of a process included in step S41 illustrated in FIG. 10.

DESCRIPTION OF EMBODIMENTS

Outline of Present Disclosure

Figure 1:
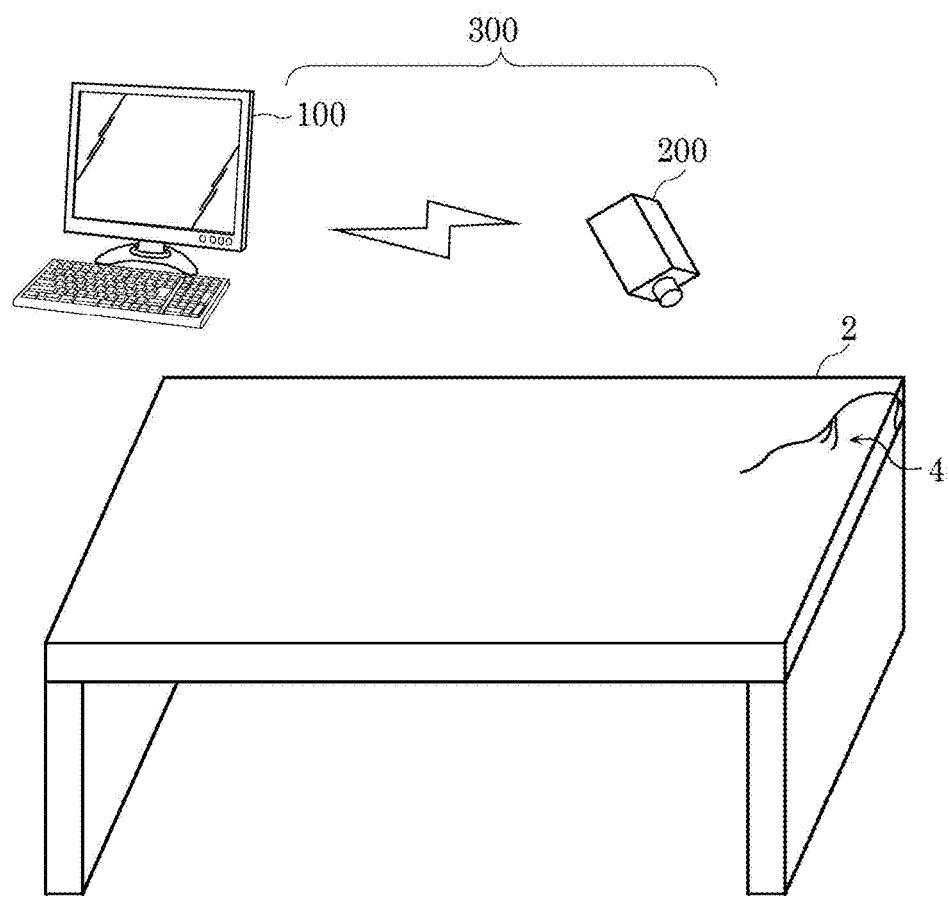
FIG. 1 is a schematic diagram illustrating one example of the configuration of a prediction system according to Embodiment 1.

A prediction device according to one aspect of the present disclosure is used to predict a growth direction of a crack that occurs in a subject and includes: an obtainer that obtains video of the subject; a derivation unit configured to derive displacement of each of a plurality of regions in the video obtained; a selector that selects, from among the plurality of regions, two or more regions each having displacement similar to displacement of a reference region included in the plurality of regions; and an identification unit configured to identify, as the growth direction, a longitudinal direction of a collective region made up of the two or more regions selected.

With this, in the case of determining a direction in which the crack may grow in the subject, it is not necessary to use an expression for calculating a strain value, for example. Therefore, even if there are effects of noise, etc., attributable to the video, effects of errors can be reduced. Thus, the growth direction of a crack that occurs in a subject can be accurately predicted by the prediction device according to one aspect of the present disclosure.

For example, in the prediction device according to one aspect of the present disclosure, the reference region may be a region including the vicinity of a tip of the crack.

With this, in the case where a crack has already occurred in a subject, the prediction device according to one aspect of the present disclosure can predict a direction in which the crack may grow.

For example, in the prediction device according to one aspect of the present disclosure, the displacement similar to the displacement of the reference region may differ from the displacement of the reference region by less than or equal to a threshold value.

With this, a region having a high degree of similarity in displacement to the reference region is selected.

For example, in the prediction device according to one aspect of the present disclosure, the derivation unit may determine a partial range of the video and derive the displacement of each of the plurality of regions included in the partial range determined.

This results in a reduction in the processing amount and therefore leads to a reduction in load on the prediction device; thus, the processing speed of the prediction device improves.

For example, in the prediction device according to one aspect of the present disclosure, the derivation unit may derive the displacement of each of the plurality of regions from two or more images included in the video.

With this, the displacement of each of the plurality of regions can be properly derived using two or more temporally different images.

For example, the prediction device according to one aspect of the present disclosure may further include a scale corrector that performs scale correction on the displacement of each of the plurality of regions to reflect a ratio of a distance of actual displacement in the region according to a distance from an imager that captures the video, and the selector may select the two or more regions using the displacement of each of the plurality of regions on which the scale correction has been performed.

With this, the displacement of each of the plurality of regions can be more accurately derived. Furthermore, because of using the corrected displacement, the prediction device according to one aspect of the present disclosure can more accurately identify the growth direction of the crack.

Furthermore, a prediction method according to one aspect of the present disclosure is for predicting a growth direction of a crack that occurs in a subject and includes: obtaining video of the subject; deriving displacement of each of a plurality of regions in the video obtained; selecting, from among the plurality of regions, two or more regions each having displacement similar to displacement of a reference region included in the plurality of regions; and identifying, as the growth direction, a longitudinal direction of a collective region made up of the two or more regions selected.

With this, in the case of determining a direction in which a crack may grow in a subject, it is not necessary to use an expression for calculating a strain value, for example. Therefore, even if there are effects of noise, etc., attributable to video, effects of errors can be reduced. Thus, the growth direction of a crack that occurs in a subject can be accurately predicted by the prediction method according to one aspect of the present disclosure.

Note that the above general or specific aspect may be implemented using a system, a device, a method, an integrated circuit, a computer program, or a computer-readable recording medium such as a recoding disc, or any combination of systems, devices, methods, integrated circuits, computer programs, and recording media. The computer-readable recording medium includes, for example, a non-volatile recording medium such as a CD-ROM.

Hereinafter, prediction devices and prediction methods according to embodiments of the present disclosure will be specifically described with reference to the Drawings.

Note that each of the embodiments described below shows a general or specific example. The numerical values, shapes, structural elements, the arrangement and connection of the structural elements, steps, the processing order of the steps etc., shown in the following embodiments are mere examples, and therefore do not limit the present disclosure. Among the structural elements in the following embodiments, structural elements not recited in any one of the independent claims defining the most generic concept are described as arbitrary structural elements. In the description of the following embodiments, there are cases where phrases including "substantially" such as substantially parallel and substantially orthogonal are used. For example, "substantially parallel" means not only being perfectly parallel, but also being virtually parallel, in other words, for example, includes a difference of about a few percent. The same applies to other phrases including "substantially". Furthermore, the description of the following embodiments assumes that principal parts are the same or two elements have the same properties, for example. Note that the figures are schematic diagrams and are not necessarily precise illustrations. In the figures, substantially identical structural elements are assigned the same reference signs, and overlapping description may be omitted or simplified.

Embodiment 1

1-1. Outline of Prediction System

First, an outline of a prediction system according to Embodiment 1 will be specifically described with reference to FIG. 1. FIG. 1 is a schematic diagram illustrating one example of the configuration of prediction system 300 according to Embodiment 1.

Prediction system 300 is a system for predicting the growth direction of crack 4 that occurs in subject 2 and includes prediction device 100 and imaging device 200.

Imaging device 200 is, for example, a digital video camera or a digital still camera including an image sensor. Imaging device 200 captures video of subject 2. More specifically, imaging device 200 captures video including images of a region in which crack 4 has occurred or a region in which crack 4 may occur. The region in which crack 4 has occurred or the region expected to be subject to crack 4 in the future (hereinafter also referred to as a region in which crack 4 may occur) may be identified through a visual test, a hammering test, or a test using sensors such as a strain sensor or may be identified through image analysis such as edge detection.

Subject 2 is, for example, a structure such as a building, a bridge, a tunnel, a dam, or a soundproof wall. Subject 2 is made of a metal such as steel, concrete, a resin such as plastics, glass, or wood, for example, Note that subject 2 is not limited to these examples and may be anything subject to cracking; for example, subject 2 may be a component of an airplane, an automobile, and a train, a component of a device, a piece of furniture, or the like.

Prediction device 100 is a device for predicting the growth direction of a crack that occurs in subject 2. Prediction device 100 is, for example, a computer, and includes a processor (not illustrated in the drawings) and memory (not illustrated in the drawings) in which a software program or an instruction is stored. By the processor executing the software program, prediction device 100 implements a plurality of functions to be described later. Prediction device 100 may be a dedicated electronic circuit (not illustrated in the drawings). In this case, the plurality of functions to be described later may be implemented by separate electronic circuits or may be implemented by a single integrated electronic circuit.

Prediction device 100 is connected to imaging device 200 so as to be able to communicate with each another, for example. Prediction device 100 obtains video of subject 2 captured by Imaging device 200, derives displacement of each of a plurality of regions in the obtained video, selects, from among the plurality of regions, two or more regions each having displacement similar to displacement of a reference region included in the plurality of regions, and identifies, as the growth direction of a crack, the longitudinal direction of a collective region made up of the two or more selected regions. A specific method for identifying the growth direction of the crack will be described later.

Note that each of the plurality of regions in the video may correspond to a single pixel or may correspond to a plurality of pixels. The displacement is an amount of spatial changes indicating a travel direction and a travel distance; for example, the displacement is a motion vector Indicating movement. The travel distance herein is not a distance of actual movement, but is a value corresponding to actual movement. For example, the travel distance is the number of pixels in each region that corresponds to the distance of actual movement. Prediction device 100 may derive a motion vector of each region as displacement of the region, for example. In this case, prediction device 100 derives a motion vector of each region by performing motion estimation on the region through block matching, for example.

When the displacement of each of the plurality of regions is derived, prediction device 100 determines a reference region from among the plurality of regions in the video and selects two or more regions each having displacement similar to displacement of the reference region, for example. For example, prediction device 100 calculates a difference between the displacement of the reference region and the displacement of each of the plurality of regions and selects a region for which the calculated difference is less than or equal to a threshold value; thus, prediction device 100 selects two or more regions each having displacement similar to the displacement of the reference region. The two or more selected regions constitute the collective region. Here, the difference in displacement between two adjacent regions is a derivative value, meaning that this indicates strain, and the strain is proportional to stress. Thus, by calculating a difference in displacement between two adjacent regions, strain that occurs between these two regions is calculated. In the collective region, the difference between the respective regions is very small with a value of from zero to the threshold value. In other words, the collective region represents a region in which strain that occurs between respective regions is very low, that is, a region having the minimum strain. Furthermore, since the stress and the strain are in a proportional relationship, when the strain is low, the stress is also low. Therefore, the collective region represents a region in which stress that acts on the respective regions is very low, that is, a region having the minimum stress, and represents a region indicating the minimum principal stress distribution. Note that crack 4 grows perpendicularly to a direction in which the highest stress acts, that is, grows in a direction in which the stress is lowest. This means that the direction in which crack 4 grows is a direction in which the strain is lowest, that is, a direction in which the difference in displacement between two adjacent regions is smallest. Note that being lowest/smallest may be the minimum value or may be a value within a predetermined range including the minimum value. This direction corresponds to the longitudinal direction of the collective region having displacement similar to the displacement of the reference region. Therefore, by identifying the longitudinal direction of the collective region as the growth direction of crack 4, prediction device 100 predicts a direction in which crack 4 may grow (hereinafter also referred to as the growth direction of crack 4).

Note that the reference region is a region including the vicinity of the tip of crack 4 or a region expected to be subject to crack 4 in the future. The region including the vicinity of the tip of crack 4 is, for example, adjacent to the tip of crack 4. Furthermore, crack 4 may be a crack that has occurred in a surface of subject 2 or may be a crack that has occurred inside subject 2. In other words, crack 4 is not limited to cracks that can be visually checked.

Note that the region in which crack 4 may occur is estimated from a region in which the difference in displacement between two adjacent regions changes among the plurality of regions in subject 2, for example. A method for detecting a region in which crack 4 has occurred or a region in which crack 4 may occur will be described later.

The displacement similar to the displacement of the reference region differs from the displacement of the reference region by less than or equal to a threshold value. The threshold value will be described later.

1-2. Configuration of Prediction Device

Figure 2:
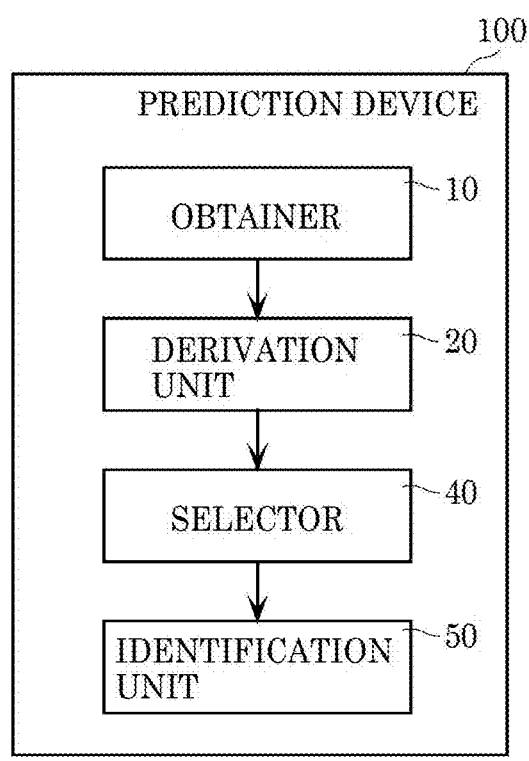
FIG. 2 is a block diagram illustrating one example of the functional configuration of a prediction device according to Embodiment 1.

Next, the functional configuration of prediction device 100 according to Embodiment 1 will be described. FIG. 2 is a block diagram illustrating one example of the functional configuration of prediction device 100 according to Embodiment 1.

As illustrated in FIG. 2, prediction device 100 includes obtainer 10, derivation unit 20, selector 40, and identification unit 50.

Obtainer 10 obtains video of subject 2. Note that from the perspective of improving the accuracy of identifying the growth direction of crack 4, the video may include video captured in at least one of a period in which subject 2 is under external load and a preceding or subsequent period in which subject 2 is not under external load. In other words, the video obtained by obtainer 10 may be video captured when the external load on subject 2 is changing. For example, in the case where subject 2 is a steel plate, the video is captured when the steel plate is micro-vibrating as a result of application of vibrations to the steel plate. For example, in the case where subject 2 is a bridge, the video obtained by obtainer 10 is video captured when a vehicle such as a train or a car is passing over the bridge. Furthermore, for example, in the case where subject 2 is a wall surface, a pillar, or a floor surface of a building, the video obtained by obtainer 10 is video captured when subject 2 is vibrating as a result of application of external force to subject 2 such as the wall surface, the pillar, or the floor surface of the building.

Note that obtainer 10 obtains video of subject 2 from imaging device 200 by wireless communication, for example. Furthermore, for example, obtainer 10 may obtain the video from imaging device 200 via a detachable memory device, for example, a universal serial bus (USB) flash drive.

Derivation unit 20 derives displacement of each of a plurality of regions in the obtained video. For example, derivation unit 20 determines a partial range in the video and derives displacement of each of a plurality of regions included in the determined partial range. The partial range in the video includes at least the reference region. As a method for deriving displacement, for example, a block matching method, a correlation method such as a normalized cross correlation method and a phase correlation method, a sampling moire method, a feature point extraction method (for example, edge extraction), a laser speckle correlation method, or the like may be used. The accuracy of deriving displacement may be on a pixel basis or may be on a sub-pixel basis. The displacement herein may be displacement on the video.

Selector 40 selects, from among the plurality of regions, two or more regions each having displacement similar to the displacement of the reference region included in the plurality of regions. When derivation unit 20 derives the displacement of each of the plurality of regions, selector 40 determines a reference region from among the plurality of regions in the video and selects two or more regions each having displacement similar to the displacement of the reference region, for example. As mentioned earlier, the reference region is a region including the vicinity of the tip of crack 4 or a region expected to be subject to crack 4 in the future, and is, for example, a region adjacent to the tip of crack 4. The displacement similar to the displacement of the reference region differs from the displacement of the reference region by less than or equal to a threshold value. Here, the collective region made up of the two or more regions selected by selector 40 may be made up of two or more regions each having displacement most similar to the displacement of the reference region or may be made up of two or more regions selected for each degree of similarity according to the degree of similarity to the displacement of the reference region. In the case where two or more regions each having displacement most similar to the displacement of the reference region are selected, the threshold value is a value very close to the displacement of the reference region. As the threshold value, a value obtained by multiplying a coefficient that varies depending on a material included in subject 2 may be used. Furthermore, the threshold value may be set to have the same value ranges on the positive side and the negative side with respect to a reference value that is a value obtained by multiplying the displacement of the reference region by a predetermined coefficient. In the case where the displacement is represented by a motion vector indicating movement, the threshold value may be set for each component at coordinates (x, y) of the motion vector.

Identification unit 50 identifies, as the growth direction of crack 4, the longitudinal direction of the collective region made up of the two or more regions selected by selector 40.

1-3. Operation of Prediction Device

Figure 3:
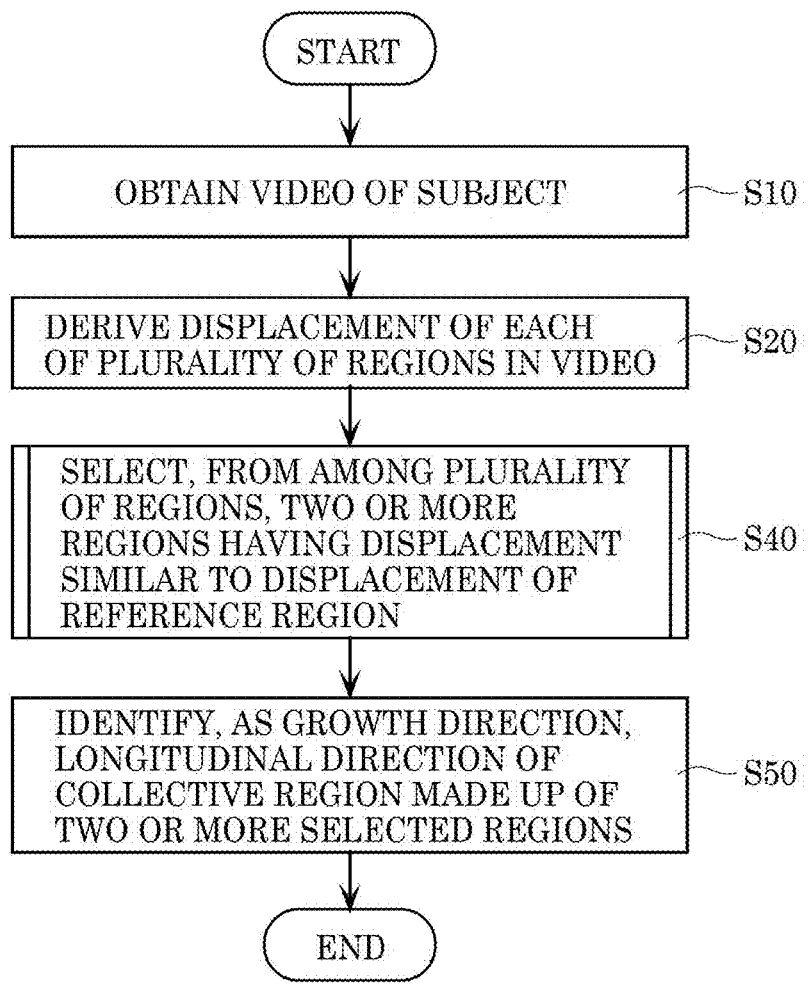
FIG. 3 is a flowchart illustrating one example of an operation of a prediction device according to Embodiment 1.

Next, one example of the operation of prediction device 100 according to Embodiment 1 will be described with reference to FIG. 3 and FIG. 4. FIG. 3 is a flowchart illustrating one example of the operation of prediction device 100 according to Embodiment 1. Note that the operation of prediction system 300 includes, before obtainment step S10 illustrated in FIG. 3, an imaging step for capturing video of subject 2 by imaging device 200. In the Imaging step, imaging device 200 captures video of subject 2 when the external load on subject 2 is changing, for example. This allows derivation unit 20 to derive, on the basis of the video obtained by obtainer 10, displacement before external load is applied to subject 2 and displacement in a period in which subject 2 is under external load. Therefore, the displacement derivation is less affected by an error occurring when subject 2 is slightly moving and an error due to shaking of imaging device 200, for example.

Note that the video of subject 2 may be images of a plurality of portions of subject 2 captured by imaging device 200 in synchronization. In this case, prediction device 100 selects, from among the plurality of obtained images, video including a region including the vicinity of the tip of crack 4, and predicts the growth direction of crack 4 on the basis of the selected video.

Note that the video of subject 2 may be captured video of a predetermined portion of subject 2 that includes a region including the vicinity of the tip of crack 4. In this case, prediction device 100 can predict the growth direction of crack 4 on the basis of the obtained video.

Note that the region including the vicinity of the tip of crack 4, for example, the region adjacent to the tip of crack 4, may be identified by a user conducting a visual test, a hammering test, or a test using sensors such as a strain sensor or may be identified by detecting crack 4 through image analysis such a feature point extraction method (for example, edge extraction), as mentioned above.

As illustrated in FIG. 3, obtainer 10 obtains video of subject 2 (obtainment step S10). Prediction device 100 may sequentially obtain video from imaging device 200 or may obtain video captured for a predetermined period. Note that prediction device 100 may obtain a plurality of images of subject 2 from imaging device 200 after completion of imaging of subject 2 by imaging device 200. A method for obtaining video by obtainer 10 is not particularly limited. As mentioned above, obtainer 10 may obtain video from Imaging device 200 by wireless communication or may obtain video via a detachable memory device such as a USB flash drive.

Next, derivation unit 20 derives displacement of each of the plurality of regions in the video obtained by obtainer 10 in obtainment step S10 (derivation step S20). The method for deriving displacement is described above, and thus description thereof will be omitted here.

Derivation unit 20 may derive displacement of each and every one of the plurality of regions in the video or may determine a partial range in the video and derive displacement of each of a plurality of regions included in the determined partial range. For example, in the case where the displacement is a motion vector indicating movement, the motion vector in each region is calculated by comparing an image of the region and, for example, an image thereof in the immediately preceding frame, that is, an image of a corresponding region in the immediately preceding frame. More specifically, while moving an Image clipped for each region, derivation unit 20 compares the image with an image of each region in an image in the immediately preceding frame, thereby searches for a position at which the degree of similarity between the images is high, and determines, as a motion vector for the region, a motion vector at the position in the image in the immediately preceding frame. In this manner, derivation unit 20 drives displacement of each of the plurality of regions and stores, into a storage (not illustrated in the drawings), data in which the derived displacement and the region are associated with each other.

Derivation unit 20 may detect crack 4 from the video obtained by obtainer 10, for example, through image analysis such a feature point extraction method (for example, edge extraction), to identify a region in which crack 4 has occurred, and determine a partial range in the video so as to include said region. Furthermore, a region in which crack 4 may occur may be estimated through a visual test, a hammering test, or the like, and a partial range in the video may be determined so as to include said region.

Note that the partial range in the video may be determined by a user of prediction device 100 selecting a partial range in the video.

Next, selector 40 selects, from among the plurality of regions, two or more regions each having displacement similar to the displacement of the reference region included in the plurality of regions (selection step S40). The reference region is a region including the vicinity of the tip of crack 4. Here, an example of the operation of selector 40 will be described. Selector 40 reads, from the storage (not illustrated in the drawings), data which is stored in the storage by derivation unit 20 and in which the derived displacement and the region are associated with each other, selects, from the read data, data of a region having displacement similar to the displacement of the reference region, and stores the selected data into the storage, for example. Thus, a region having displacement that differs from the displacement of the reference region by less than or equal to the threshold value is selected. As mentioned above, the difference in displacement is a derivative value and thus indicates strain, and the strain is proportional to stress. Therefore, the selected region represents a region having the lowest stress and strain. Note that details of selection step S40 will be described later with reference to FIG. 4.

Next, identification unit 50 identifies, as the growth direction of crack 4, the longitudinal direction of a collective region made up of two or more regions selected by selector 40 in selectin step S40 (identification step S50). For example, identification unit 50 reads, from the storage (not illustrated in the drawings), data of a region having displacement similar to the displacement of the reference region and derives the longitudinal direction of the collective region on the basis of the read data. As mentioned above, the collective region is a region having the minimum strain and indicating the minimum principal stress distribution. Crack 4 grows perpendicularly to a direction in which the highest stress acts, that is, grows in a direction in which the stress is lowest. This means that the direction in which crack 4 grows is a direction in which the strain is lowest, that is, a direction in which the difference in displacement between two adjacent regions is smallest. This direction corresponds to the longitudinal direction of the collective region. Therefore, identification unit 50 identifies the longitudinal direction of the collective region as the growth direction of crack 4.

Here, selection step S40 will be more specifically described with reference to FIG. 4.

In selection step S40, selector 40 determines a reference region from among a plurality of regions (step S42) and determines, for each of the plurality of regions, whether or not the difference between the displacement of the region and the displacement of the reference region is less than or equal to the threshold value (step S44). The threshold value is described above, and thus description thereof will be omitted here.

Regarding one region included the plurality of regions, when the difference between the displacement of said region and the displacement of the reference region is less than or equal to the threshold value (YES In step S44), said region is determined as a region having displacement similar to the displacement of the reference region (step S46). In this case, selector 40 adds a flag to said region and stores said region with the flag into the storage (not illustrated in the drawings), for example. Note that the storage (not illustrated in the drawings) may be provided in prediction device 100 as an element separate from selector 40. On the other hand, regarding one region included the plurality of regions, when the difference between the displacement of said region and the displacement of the reference region is not less than or equal to the threshold value (NO in step S44), selector 40 does not perform the process in step S46.

After the processes in step S44 and step S46 are performed on all of the plurality of regions, that is, after completion of the loop process for each region, selector 40 selects two or more regions each determined as having displacement similar to the displacement of the reference region (step S48). At this time, selector 40 may read, from the storage (not illustrated in the drawings), data of the region stored in the storage in step S46, select, from the read data, two or more regions each determined as having displacement similar to the displacement of the reference region, and reflect, in the video, a collective region including the two or more regions.

Figure 4:
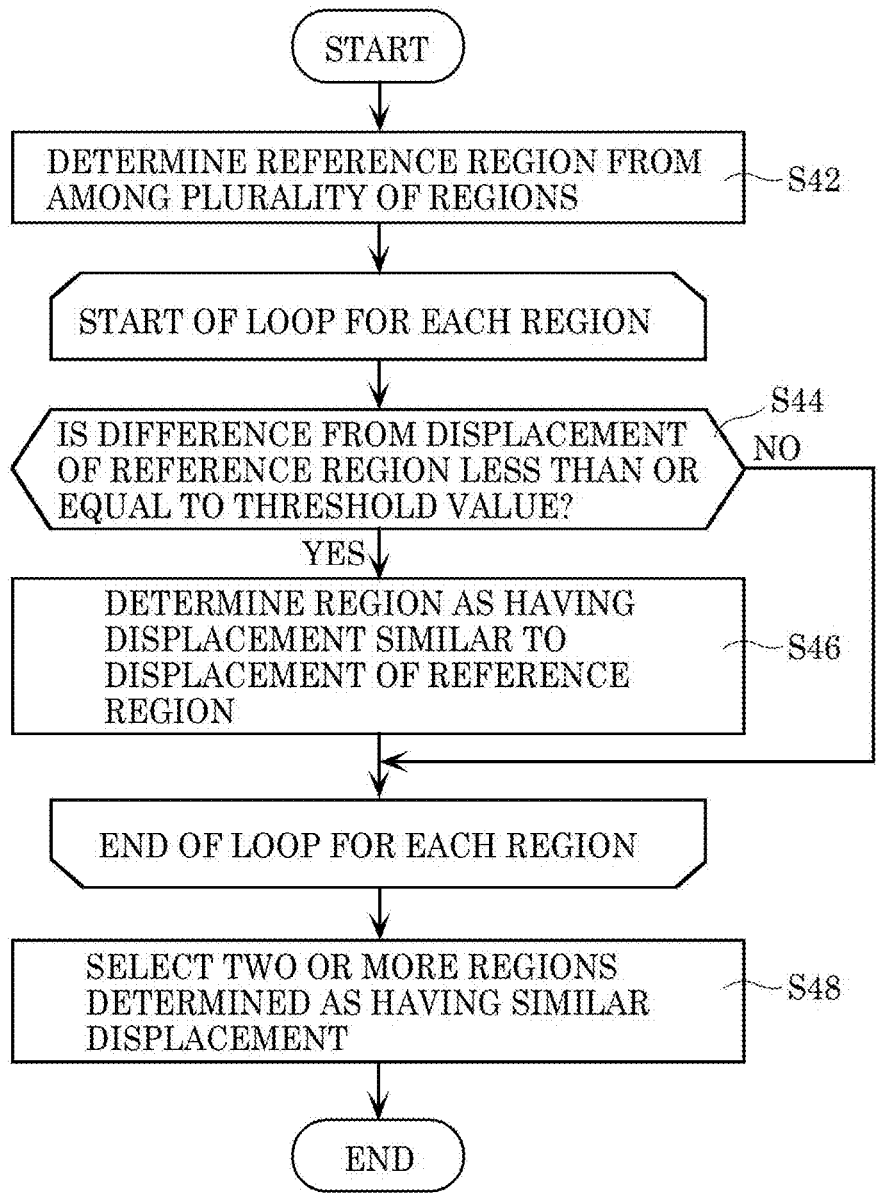
FIG. 4 is a flowchart illustrating a detailed flow of a process included in step S40 illustrated in FIG. 3.

Note that although FIG. 4 illustrates an example in which the process loop for each region is completed after one cycle, more than one threshold value may be set according to the degree of similarity to the displacement of the reference region, and the plurality of regions may be classified according to the degree of similarity to the displacement of the reference region, for example. For example, after the process loop is performed on each region using a threshold value (referred to as a first threshold value, for example) having a high degree of similarity to the displacement of the reference region, the process loop is performed on a region determined as having displacement that differs from the displacement of the reference region by not less than or equal to the first threshold value (NO in step S44), using a threshold value (referred to as a second threshold value, for example) having the next highest degree of similarity to the displacement of the reference region. Thus, the plurality of regions can be divided into a plurality of collective regions according to the degree of similarity to the displacement of the reference region, and the growth direction of crack 4 in subject 2 can be more accurately predicted.

As described above, prediction device 100 obtains captured video of subject 2, derives displacement of each of the plurality of regions in the obtained video, selects, from among the plurality of regions, two or more regions each having displacement similar to the displacement of the reference region included in the plurality of regions, identifies, as the growth direction of crack 4 that occurs in subject 2, the longitudinal direction of a collective region made up of the two or more selected regions, and thus predicts the growth direction of crack 4.

Note that the process in selection step S40 does not necessarily need to be performed after the process in derivation step S20. The process in selection step S40 may be performed, for example, in parallel with the process in derivation step S20.

The process in identification step S50 does not necessarily need to be performed after the process in selection step S40. The process in identification step S50 may be performed, for example, in parallel with the process in selection step S40.

1-4. Examples

Next, a method for predicting the growth direction of crack 4 using prediction device 100 according to Embodiment 1 will be more specifically described while citing examples.

Prediction device 100 detects crack 4 (refer to FIG. 1) that has occurred in subject 2 from the video captured by imaging device 200 (refer to FIG. 1) using an image analysis technique such as edge detection, for example. Detected crack 4 is identified as a region including a portion of crack 4 among the plurality of regions in the video.

Note that crack 4 that has occurred in subject 2 may be detected before prediction device 100 obtains the video of subject 2 or may be detected after prediction device 100 obtains the video of subject 2. Details in each case are described above, and thus description thereof will be omitted here.

Figure 5:
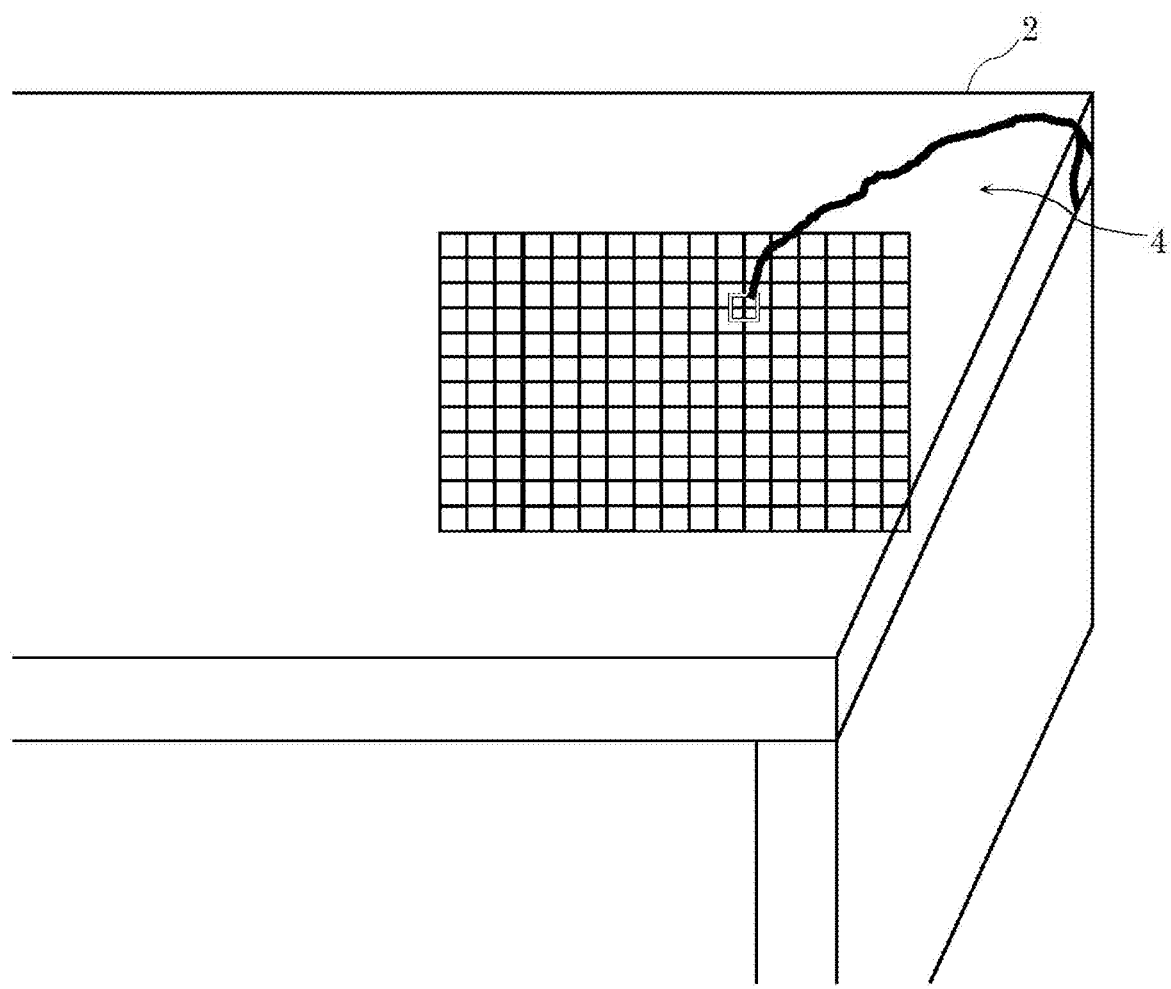
FIG. 5 illustrates one example in which a reference region is determined from among a plurality of regions in captured video.

FIG. 5 illustrates one example in which the reference region is determined from among the plurality of regions in the captured video. Prediction device 100 determines the reference region from among the plurality of regions in the video and determines a partial range in the video so as to include the reference region. The reference region is the dual-frame region illustrated in FIG. 5. The reference region is a region including the vicinity of the tip of crack 4 or a region expected to be subject to crack 4 in the future. Here, the reference region is a region adjacent to the tip of crack 4.

Prediction device 100 derives displacement of each of the plurality of regions in the partial range in the video and stores, into the storage (not illustrated in the drawings), data in which the derived displacement and the region are associated with each other.

Figure 6:
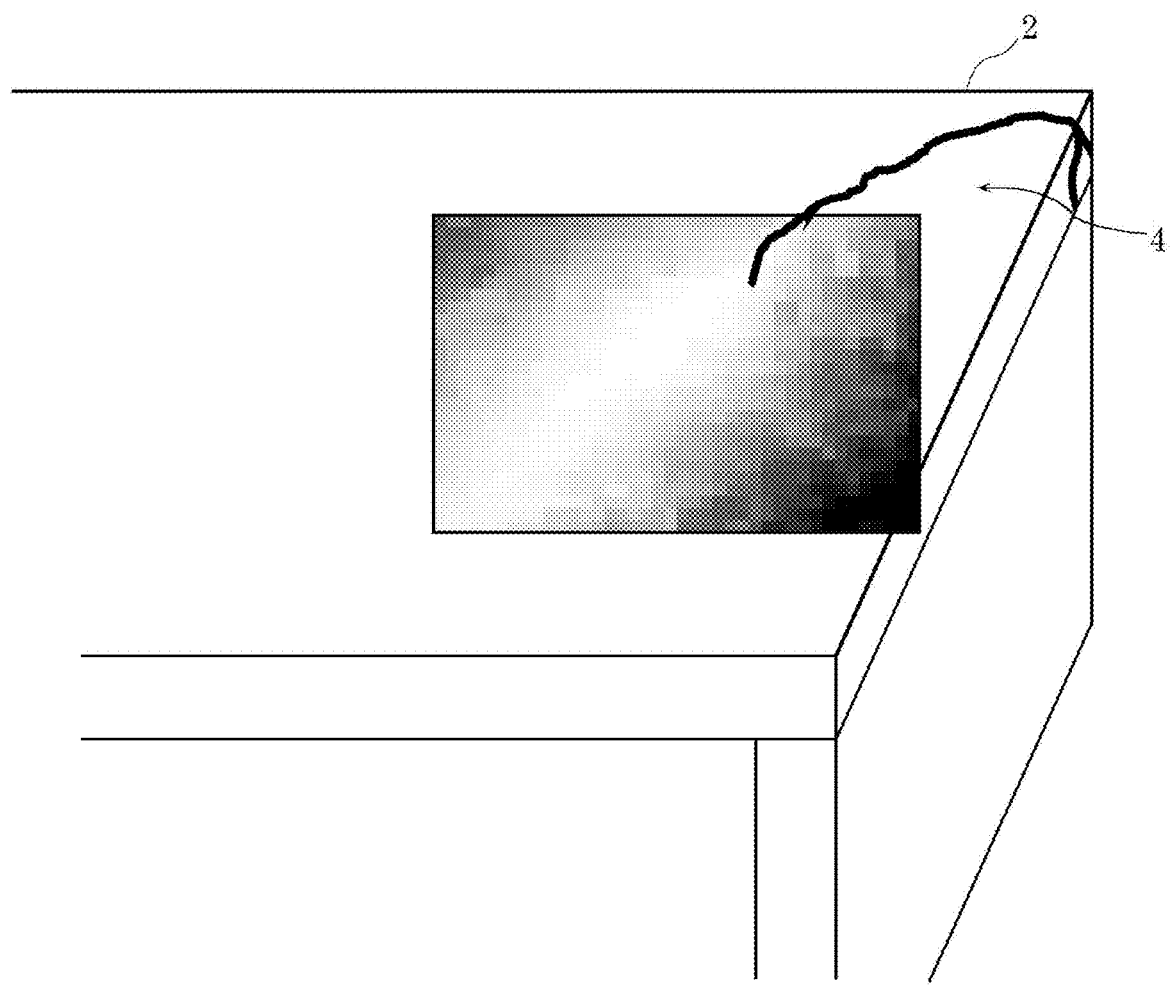
FIG. 6 illustrates one example in which two or more regions each having displacement similar to displacement of the reference region illustrated in FIG. 5 are selected.

Next, FIG. 6 illustrates one example in which two or more regions each having displacement similar to the displacement of the reference region illustrated in FIG. 5 are selected. The following describes an example in which more than one threshold value is provided according to the degree of similarity to the displacement of the reference region and the plurality of regions are classified according to the degree of similarity to the displacement of the reference region.

As described with reference to FIG. 4, after performing the process loop indicated in Steps S44 to S46 on each region using the first threshold value having a high degree of similarity to the displacement of the reference region, prediction device 100 performs the process loop Indicated in Steps S44 to S46 on a region determined as having displacement that differs from the displacement of the reference region by not less than or equal to the first threshold value (NO in step S44), using the second threshold value having the next highest degree of similarity to the displacement of the reference region. Thus, the plurality of regions in the video are classified into a plurality of collective regions according to the degree of similarity to the displacement of the reference region, as illustrated in FIG. 6. A region having a high degree of similarity to the displacement of the reference region is shown in white, and a region having a lower degree of similarity to the displacement of the reference region is shown in a darker color. Therefore, the white region illustrated in FIG. 6 is a collective region made up of regions having displacement similar to the displacement of the reference region.

Figure 7:
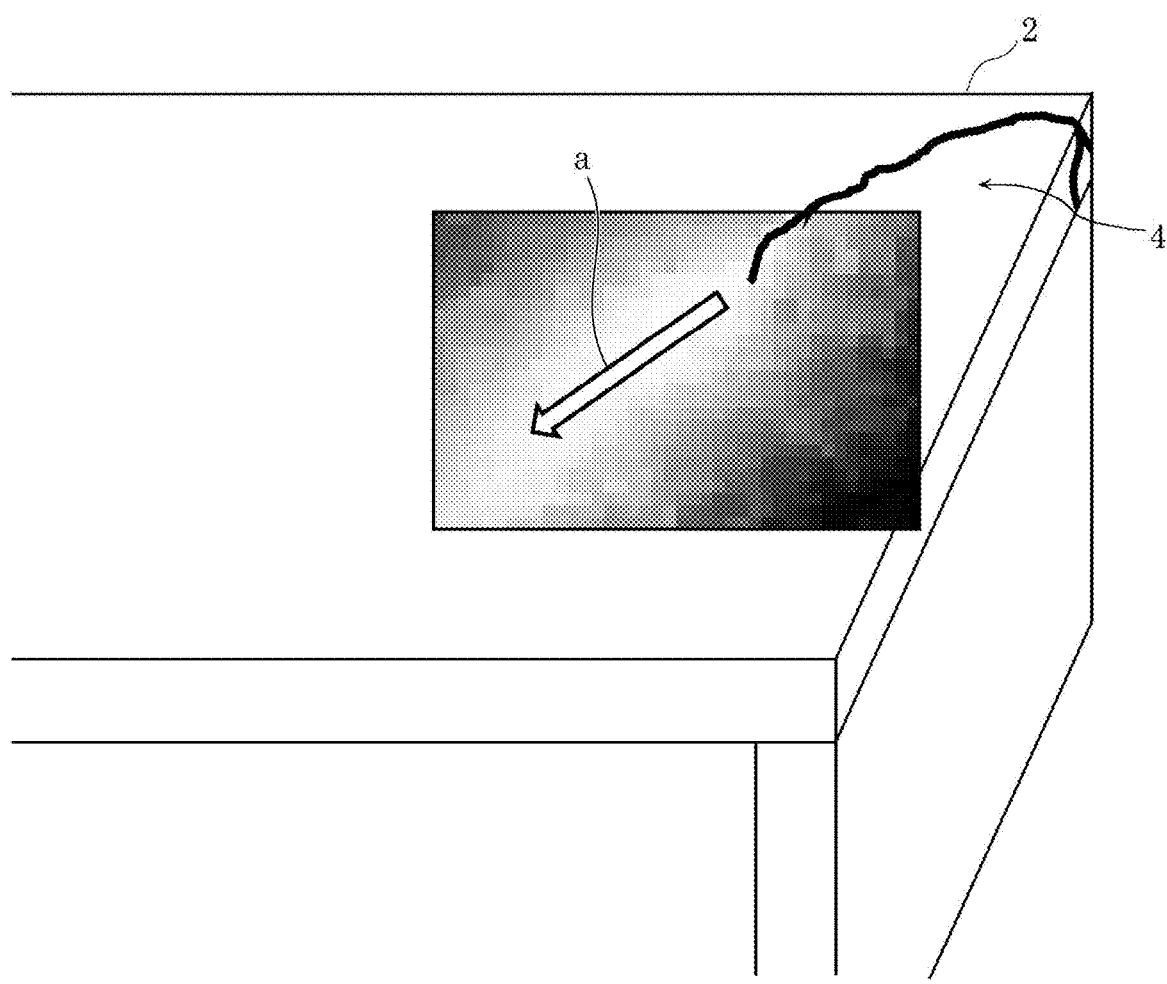
FIG. 7 illustrates the longitudinal direction of the collective region illustrated in FIG. 6.
Figure 8:
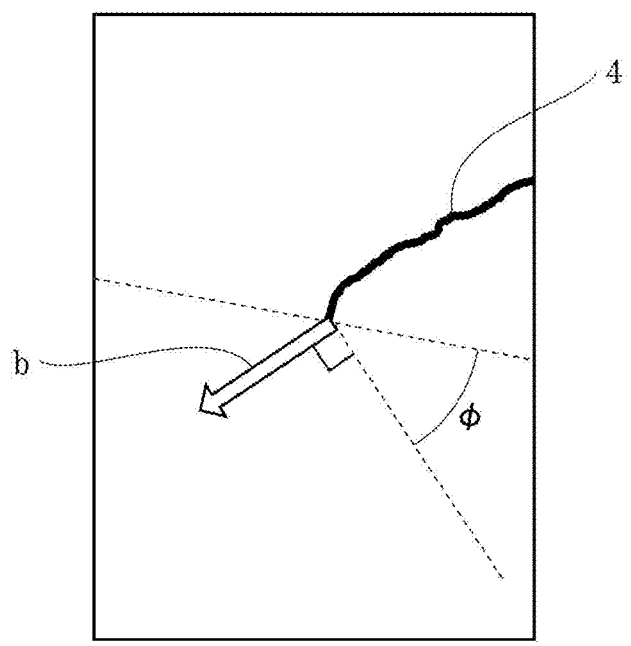
FIG. 8 illustrates the growth direction of a crack.

FIG. 7 illustrates longitudinal direction a of the collective region illustrated in FIG. 6. FIG. 8 illustrates growth direction b of a crack. As mentioned above, the collective region is a region having the minimum principal stress. Therefore, longitudinal direction a of the collective region illustrated in FIG. 7 indicates the direction of the minimum principal stress. This direction of the minimum principal stress matches arrow b illustrated in FIG. 8.

In FIG. 8, $\varphi$ indicates a maximum principal strain angle assuming that the tip of crack 4 is a reference. The maximum principal stress acts on the tip of crack 4 in the direction of maximum principal strain angle $\varphi$. The minimum principal stress acts perpendicularly to maximum principal strain angle $\varphi$, that is, in the direction of arrow b. As mentioned above, crack 4 grows in a direction in which the minimum principal stress acts. Therefore, arrow b illustrated in FIG. 8 matches longitudinal direction a of the collective region illustrated in FIG. 7.

As described above, prediction device 100 can predict the growth direction of crack 4 by identifying, as the growth direction of crack 4, the longitudinal direction of the collective region, without using an expression for calculating a strain value. By using prediction device 100, it is possible to identify the direction of the minimum principal stress without using an expression for calculating a strain value, and thus an increase in errors can be suppressed. Therefore, according to Embodiment 1, the growth direction of crack 4 that occurs in subject 2 can be accurately predicted.

1-5. Advantageous Effects, Etc.

As described above, prediction device 100 according to Embodiment 1 is used to predict the growth direction of crack 4 that occurs in subject 2 and includes: obtainer 10 that obtains video of subject 2; derivation unit 20 that derives displacement of each of a plurality of regions in the obtained video; selector 40 that selects, from among the plurality of regions, two or more regions each having displacement similar to displacement of a reference region included in the plurality of regions; and identification unit 50 that identifies, as the growth direction, the longitudinal direction of a collective region made up of the two or more selected regions.

Furthermore, the prediction method according to Embodiment 1 is used to predict the growth direction of a crack that occurs in a subject and includes: obtainment step S10 for obtaining video of the subject; derivation step S20 for deriving displacement of each of a plurality of regions included in the video; selection step S40 for selecting, from among the plurality of regions, two or more regions each having displacement similar to displacement of a reference region included in the plurality of regions; and identification step S50 for identifying, as the growth direction, the longitudinal direction of a collective region made up of the two or more selected regions.

With this, in the case of determining a direction in which crack 4 may grow in subject 2, it is not necessary to use an expression for calculating a strain value, for example. Therefore, even if there are effects of noise, etc., attributable to the video, effects of errors can be reduced. Thus, with prediction device 100, it is possible to accurately predict the growth direction of crack 4 that occurs in subject 2.

For example, in prediction device 100 according to Embodiment 1, the reference region is a region including the vicinity of the tip of crack 4.

With this, in the case where crack 4 has already occurred in subject 2, prediction device 100 can predict a direction in which crack 4 may grow.

For example, in prediction device 100 according to Embodiment 1, the displacement similar to the displacement of the reference region differs from the displacement of the reference region by less than or equal to a threshold value.

With this, a region having a high degree of similarity in displacement to the reference region is selected.

For example, in prediction device 100 according to Embodiment 1, derivation unit 20 may determine a partial range of the video and derive the displacement of each of the plurality of regions included in the determined partial range.

This results in a reduction in the processing amount and therefore leads to a reduction in load on prediction device 100; thus, the processing speed of prediction device 100 improves.

In prediction device 100 according to Embodiment 1, derivation unit 20 derives displacement of each of the plurality of regions from two or more images included in the video.

With this, the displacement of each of the plurality of regions can be properly derived using two or more temporally different images.

Embodiment 2

2-1. Configuration of Prediction Device

Figure 9:
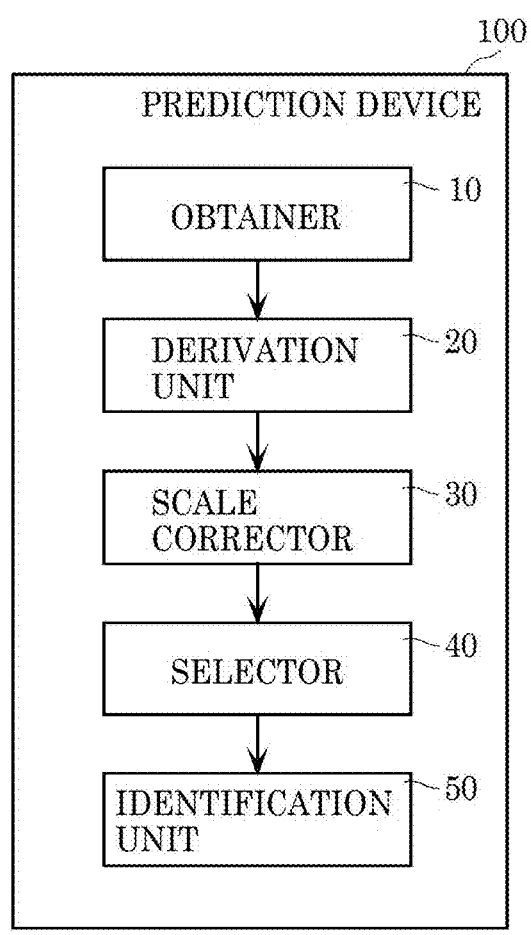
FIG. 9 is a block diagram illustrating one example of the functional configuration of a prediction device according to Embodiment 2.

Next, a prediction device according to Embodiment 2 will be described with reference to FIG. 9. FIG. 9 is a block diagram illustrating one example of the functional configuration of prediction device 100 according to Embodiment 2. Prediction device 100 according to Embodiment 2 is different from prediction device 100 according to Embodiment 1 in that prediction device 100 according to Embodiment 2 further includes scale corrector 30 and identification unit 50 uses the displacement of each of the plurality of regions corrected by scale corrector 30. Hereinafter, prediction device 100 according to Embodiment 2 will be described focusing on the points of difference with prediction device 100 according to Embodiment 1.

As illustrated in FIG. 9, prediction device 100 according to Embodiment 2 includes scale corrector 30 in addition to obtainer 10, derivation unit 20, selector 40, and identification unit 50. Scale corrector 30 corrects the displacement of each of the plurality of regions according to the distance from an imager that captures the video, that is, imaging device 200 (refer to FIG. 1) herein.

For example, when the ratio between displacement in the captured video and displacement in real space depends on the difference in the distance between the imaging position of imaging device 200 and each of the plurality of regions, scale corrector 30 performs scale correction to equalize this ratio where necessary. This scale correction may be performed on the derived displacement or may be performed on the captured video.

Using the displacement of each of the plurality of regions corrected by scale corrector 30, selector 40 selects, from among the plurality of regions, two or more regions each having displacement similar to the displacement of the reference region.

2-2. Operation of Prediction Device

Next, one example of the operation of prediction device 100 will be described with reference to FIG. 10. FIG. 10 is a flowchart illustrating one example of the operation of prediction device 100 according to Embodiment 2. Note that as in Embodiment 1, the operation of prediction system 300 includes, before obtainment step S10 illustrated in FIG. 10, an imaging step for capturing video of subject 2 by imaging device 200. In the imaging step, the video of subject 2 that is slightly moving is captured. Hereinafter, the operation of prediction device 100 according to Embodiment 2 will be described focusing on the points of difference with Embodiment 1.

As illustrated in FIG. 10, obtainer 10 obtains video of subject 2 (obtainment step S10). Next, derivation unit 20 derives displacement of each of the plurality of regions in the video obtained by obtainer 10 in obtainment step S10 (derivation step S20).

Next, scale corrector 30 performs scale correction on the displacement of each of the plurality of regions to reflect the ratio of the distance of actual displacement in the region according to the distance from imaging device 200 which captures the video (scale correction step S30). More specifically, scale corrector 30 reads, from the storage (not illustrated in the drawings), information of displacement in each of the plurality of regions derived by derivation unit 20, for example, coordinates in real space, and performs the scale correction using the read coordinates in real space to reflect the ratio of the distance of actual displacement in the region. Note that when the ratio between displacement in the captured video and displacement in real space depends on the difference in the distance between the imaging position of imaging device 200 and each of the plurality of regions, scale corrector 30 may perform the scale correction to equalize this ratio where necessary.

Next, using the displacement of each of the plurality of regions corrected by scale corrector 30, selector 40 selects, from among the plurality of regions, two or more regions each having displacement similar to the displacement of the reference region (selection step S41). Note that Embodiment 2 is different from Embodiment 1 in that the displacement on which the scale correction has been performed is used, but in Embodiment 2, the other points in the process flow in selector 40 are substantially the same as those in Embodiment 1. Details of selection step S41 will be described later with reference to FIG. 11.

Next, identification unit 50 identifies, as the growth direction of crack 4, the longitudinal direction of a collective region made up of two or more regions selected by selector 40 in selectin step S41 (identification step S50).

Here, selection step S41 will be more specifically described with reference to FIG. 11.

In selection step S41, selector 40 determines a reference region from among a plurality of regions on which the scale correction has been performed (Step S43) and determines, for each of the plurality of regions, whether or not the difference between the displacement of the region and the displacement of the reference region is less than or equal to the threshold value (step S44). More specifically, selector 40 calculates a difference between the displacement of the reference region and the displacement of each of the plurality of regions and determines whether or not the difference is less than or equal to the threshold value.

When the difference between the displacement of one region included in the plurality of regions and the displacement of the reference region is less than or equal to the threshold value (YES in step S44), said region is determined as a region having displacement similar to the displacement of the reference region (step S46). On the other hand, when the difference between the displacement of one region included in the plurality of regions and the displacement of the reference region is not less than or equal to the threshold value (NO in step S44), selector 40 does not perform the process in step S46.

After the processes in step S44 and step S46 are performed on all of the plurality of regions, that is, after completion of the loop process for each region, selector 40 selects two or more regions each determined as having displacement similar to the displacement of the reference region (step S48). At this time, selector 40 may read, from the storage, data of the region stored in the storage in step S46, select, from the read data, two or more regions each determined as having displacement similar to the displacement of the reference region, and reflect, in the video, a collective region including the two or more regions.

Note that although FIG. 11 illustrate an example in which the process loop for each region is completed after one cycle, more than one threshold value may be set according to the degree of similarity to the displacement of the reference region, and the plurality of regions may be classified according to the degree of similarity to the displacement of the reference region, for example. Specific details are substantially the same as those described in Embodiment 1, and thus description thereof will be omitted here.

As described above, prediction device 100 according to Embodiment 2 obtains captured video of subject 2, derives displacement of each of a plurality of regions in the obtained video, performs scale correction on the displacement of each of the plurality of regions to reflect the ratio of the distance of actual displacement in the region according to the distance from an imager that captures the video, selects, from among the plurality of regions, two or more regions each having displacement similar to displacement of a reference region included in the plurality of regions, identifies, as the growth direction of crack 4 that occurs in subject 2, the longitudinal direction of a collective region made up of the two or more selected regions, and thus predicts the growth direction of crack 4.

Note that the process in scale correction step S30 does not necessarily need to be performed after the process in derivation step S20. The process in scale correction step S30 may be performed, for example, in parallel with the process in derivation step S20.

Note that the process in selection step S41 does not necessarily need to be performed after the process in derivation step S20. The process in selection step S41 may be performed, for example, in parallel with the process in derivation step S20.

The process in identification step S50 does not necessarily need to be performed after the process in selection step S41. The process in identification step S50 may be performed, for example, in parallel with the process in selection step S41.

2-3. Advantageous Effects, Etc.

As described above, prediction device 100 according to Embodiment 2 further includes scale corrector 30 which performs scale correction on the displacement of each of the plurality of regions to reflect the ratio of the distance of actual displacement in the region according to the distance from an imager (for example, imaging device 200 illustrated in FIG. 1) that captures the video, and selector 40 selects two or more regions using the displacement of each of the plurality of regions on which the scale correction has been performed.

With this, the displacement of each of the plurality of regions can be more accurately derived. Furthermore, because of using the corrected displacement, it is possible to identify the growth direction of crack 4 more accurately.

Other Embodiments

Although the prediction device and the prediction method according to one or more aspects of the present disclosure have been thus far described based on the embodiments, the present disclosure is not limited to these embodiments. Various modifications to the embodiments that can be conceived by those skilled in the art, and forms configured by combining structural elements in different embodiments, without departing from the teachings of the present disclosure may be included in one or more aspects of the present disclosure.

For example, the prediction system according to each of the above embodiments is described as including a single imaging device, but two or more imaging devices may be included. This makes it possible to obtain two or more captured images and thus enables precise measurement of the three-dimensional shape of the subject through three-dimensional reconstruction techniques such as structure from motion (SfM). Thus, the growth direction of a crack can be more accurately identified.

Furthermore, for example, some or all of the structural elements included in the prediction device according to each of the above embodiments may be one system LSI (Large Scale Integration: large scale integrated circuit). For example, the prediction device may include system LSI including the obtainer, the derivation unit, and the identification unit.

The system LSI is a super multifunctional LSI manufactured by integrating a plurality of components onto a single chip. Specifically, the system LSI is a computer system configured of a microprocessor, read-only memory (ROM), random-access memory (RAM), and so on. A computer program is stored in the ROM. The system LSI achieves its function as a result of the microprocessor operating according to the computer program.

Note that although a system LSI is mentioned here, there are instances where the designations IC, LSI, super LSI, and ultra LSI are used depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

One aspect of the present disclosure may be not only the prediction device described above, but also a prediction method including, as steps, characteristic components included in the prediction device. Furthermore, one aspect of the present disclosure may also be a computer program for causing a computer to execute the respective characteristic steps included in the prediction method. Moreover, one aspect of the present disclosure may also be a non-transitory computer-readable recording medium on which this sort of computer program is recorded.

Note that in the above embodiments, each of the structural elements may be configured in the form of an exclusive hardware product or may be implemented by executing a software program suitable for the structural element. Each of the structural elements may be implemented by a program executor such as a central processing unit (CPU) or a processor reading and executing the software program recorded on a recording medium such as a hard disk or a semiconductor memory. Here, software for implementing the prediction device, etc., according to the above embodiments is a program described below.

Specifically, this program causes a computer to execute a prediction method for predicting a growth direction of a crack that occurs in a subject, and the method includes: obtaining video of the subject; deriving displacement of each of a plurality of regions in the video obtained; selecting, from among the plurality of regions, two or more regions each having displacement similar to displacement of a reference region included in the plurality of regions; and identifying, as the growth direction, a longitudinal direction of a collective region made up of the two or more regions selected.

The herein disclosed subject matter is to be considered descriptive and illustrative only, and the appended Claims are of a scope Intended to cover and encompass not only the particular embodiments disclosed, but also equivalent structures, methods, and/or uses.

INDUSTRIAL APPLICABILITY

The present disclosure can be widely used for a prediction device that predicts the growth direction of a crack that has occurred in a subject or a crack that may occur in a subject.

The invention claimed is:

1. A prediction device for predicting a growth direction of a crack that occurs in a subject, the prediction device comprising:
  a processor; and
  a memory,
  wherein, using the memory, the processor:
  obtains video of the subject;
  derives displacement of each of a plurality of regions in the video obtained;
  selects, from among the plurality of regions, two or more regions each having displacement of which a difference from displacement of a reference region included in the plurality of regions is within a threshold value; and
  identifies, as the growth direction, a longitudinal direction of a collective region made up of the two or more regions selected,
  wherein the deriving of the displacement is performed on a pixel basis or on a sub-pixel basis and is performed by determining a partial spatial range in the video obtained and deriving displacement for each of the plurality of regions in the determined partial spatial range of the video obtained, the partial spatial range including at least the reference region, and
  wherein the displacement to be derived is a displacement between frames.

2. The prediction device according to claim 1, wherein the reference region is a region within a vicinity of a tip of the crack.

3. The prediction device according to claim 1, wherein the processor is configured to derive the displacement of each of the plurality of regions from two or more images included in the video.

4. The prediction device according to claim 1, wherein the processor further:
  performs scale correction on the displacement of each of the plurality of regions to reflect a ratio of a distance of actual displacement in the region according to a distance from an imager that captures the video; and
  selects the two or more regions using the displacement of each of the plurality of regions on which the scale correction has been performed.

5. The prediction device according to claim 1, wherein any one of a block matching method, a correlation method, a sampling moire method, a feature point extraction method, and a laser speckle correlation method may be used as a method to derive the displacement.

6. A prediction method for predicting a growth direction of a crack that occurs in a subject, the prediction method comprising:
  obtaining video of the subject;
  deriving displacement of each of a plurality of regions in the video obtained;
  selecting, from among the plurality of regions, two or more regions each having displacement of which a difference from displacement of a reference region included in the plurality of regions is within a threshold value; and
  identifying, as the growth direction, a longitudinal direction of a collective region made up of the two or more regions selected,
  wherein the deriving of the displacement is performed on a pixel basis or on a sub-pixel basis and is performed by determining a partial spatial range in the video obtained and deriving displacement for each of the plurality of regions in the determined partial spatial range of the video obtained, the partial spatial range including at least the reference region, and
  wherein the displacement to be derived is a displacement between frames.

* * * * *